US007244185B2

(12) United States Patent
Kamdem et al.

(10) Patent No.: US 7,244,185 B2
(45) Date of Patent: Jul. 17, 2007

(54) DECOUPLING ELEMENT OF DEFORMABLE MATERIAL IN A POWER TRANSMISSION SYSTEM

(75) Inventors: Henri Kamdem, Tours (FR); Willy Bourdeau, Villebarou (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/721,884

(22) Filed: Nov. 26, 2003

(65) Prior Publication Data

US 2004/0198499 A1    Oct. 7, 2004

(30) Foreign Application Priority Data

Apr. 2, 2003   (FR) ................... 03 04124
Nov. 7, 2003   (FR) ................... 03 13124

(51) Int. Cl.
  *F16D 3/76* (2006.01)
(52) U.S. Cl. .......................... 464/75; 474/902
(58) Field of Classification Search ............ 464/73–75, 464/89; 403/359.1, 359.6; 474/94, 902, 474/903
See application file for complete search history.

(56) References Cited

U.S. PATENT DOCUMENTS

| | | | | |
|---|---|---|---|---|
| 1,775,556 A | * | 9/1930 | Hewel | |
| 2,232,637 A | * | 2/1941 | Schmitter | 464/89 X |
| 2,235,605 A | * | 3/1941 | Bugatti | 464/89 X |
| 2,539,630 A | * | 1/1951 | Krueger et al. | 464/89 X |
| 3,362,191 A | | 1/1968 | Louette | |
| 4,034,575 A | * | 7/1977 | Barth | 464/73 |
| 4,037,431 A | * | 7/1977 | Sugimoto | 464/73 |
| 4,143,525 A | | 3/1979 | Major | |
| 4,472,154 A | * | 9/1984 | Kryscyk | 464/73 |
| 4,977,793 A | * | 12/1990 | Husted | 403/359.6 X |
| 5,178,026 A | * | 1/1993 | Matsumoto | 464/73 X |
| 5,564,981 A | | 10/1996 | Iwabuchi et al. | |
| 6,183,230 B1 | * | 2/2001 | Beardmore et al. | 464/89 X |
| 6,581,267 B1 | * | 6/2003 | Olbrich | 464/89 X |
| 2003/0186749 A1 | * | 10/2003 | Hauck | 464/75 |

FOREIGN PATENT DOCUMENTS

| | | | |
|---|---|---|---|
| DE | 196 18 635 C1 | 5/1997 | |
| DE | 196 19 434 A1 | 11/1997 | |
| EP | 0 702 167 A1 | 3/1996 | |
| EP | 0702167 | 3/1996 | |
| EP | 0 740 077 A2 | 10/1996 | |
| EP | 0740077 | 10/1996 | |
| EP | 0793031 | 9/1997 | |
| GB | 245847 | * 1/1926 | ............ 464/89 |

* cited by examiner

*Primary Examiner*—Greg Binda
(74) *Attorney, Agent, or Firm*—Clark & Brody

(57) ABSTRACT

The invention seeks to improve the transfer function of drive devices such as pulleys and other coupling means, and it proposes creating zones of shear in the inserted deformable material forming a decoupling element. In an embodiment, the decoupling element is made in the form of a ring (2) presenting at least one meshing face (21*e*, 21*i*) complementary to a corresponding meshing face (31, 41) formed on the facing support (3, 4), the meshing projections (2*e*, 2*i*, 3*e*, 4*i*) engaging in one another to take up power transmission torque by working in shear by being blocked against each other during rotation. The invention is applicable to all drive devices including a filtering, damping, or absorbing element, e.g. for use in the automotive industry.

15 Claims, 11 Drawing Sheets

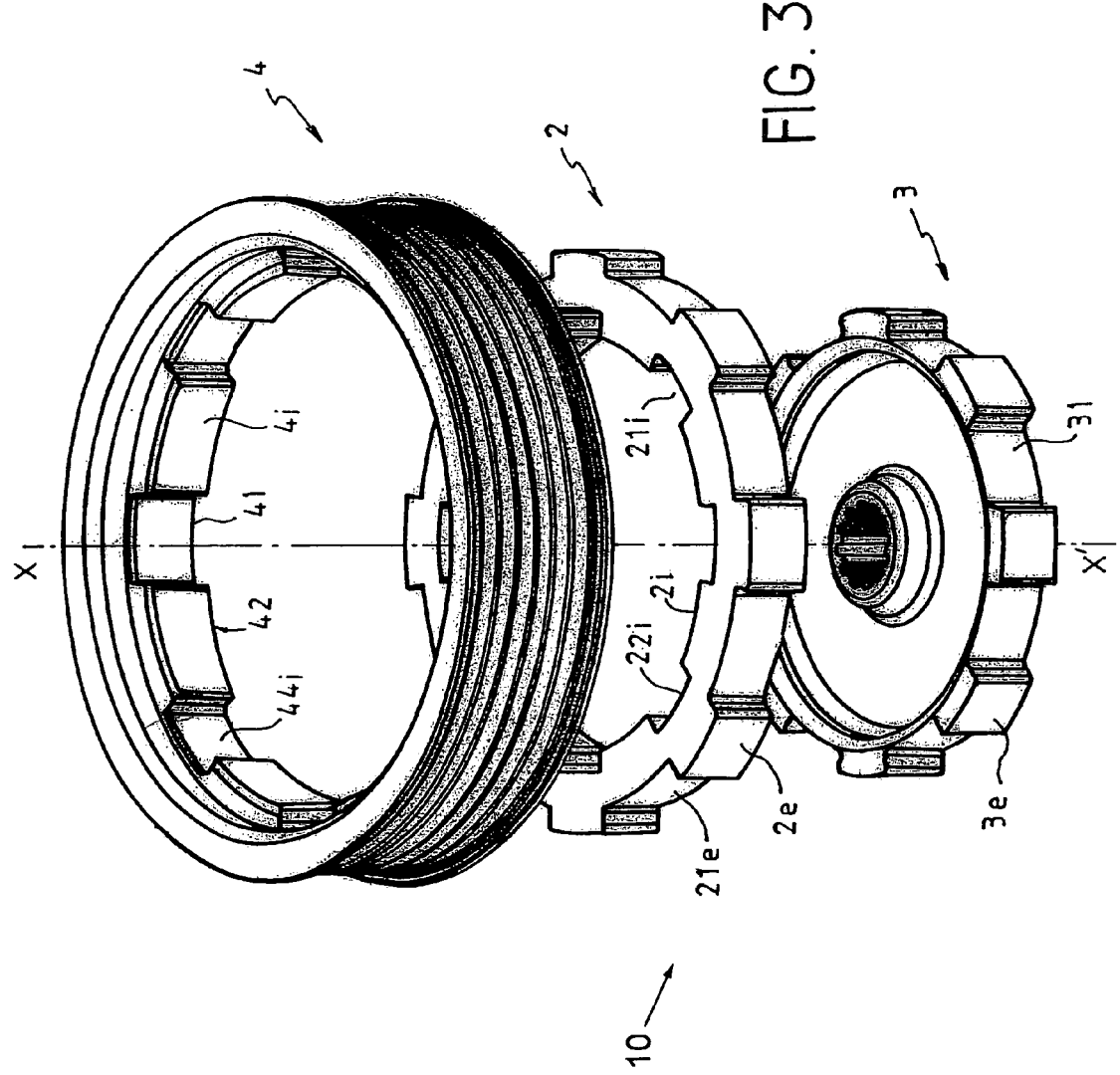

DECOUPLING ELEMENT OF DEFORMABLE MATERIAL IN A POWER TRANSMISSION SYSTEM

BACKGROUND OF THE INVENTION

The invention relates to a decoupling element of deformable material, such as rubber or elastomer, for a rotary drive device such as a pulley, a wheel, etc. in a power transmission system for a compressor, alternator, starter, or any other type of accessory that needs to be driven in rotation.

As shown in the diagrammatic longitudinal and cross-section views of FIGS. 1a and 1b, pulleys or other rotary coupling means generally interpose a portion A of annular shape made of rubber having a section that is rectangular or shaped, between a rim B and a central hub C. By deforming in shear, between a rest position $K_0$ and a position K in rotation, this piece allows a certain amount of angular offset to occur, thereby performing its decoupling function, in particular as a frequency filter and damper between the exciter (arrow E) and the response (arrow R). FIG. 1c shows a cross section similar to that of FIG. 1a with a link insert or friction layer D. The link insert is described in U.S. Pat. No. 5,377,962 to Ochs et al.

The ring A is generally fixed via its inside and outside faces by overmolding or bonding to cylindrical supports made of metal or plastics material and forming respectively the inner hub and the outer rim. It is generally also appropriate to bond the ring to strength members which are themselves force-fitted between the rim and the hub.

That solution, as disclosed for example in patent EP 0 740 077 presents numerous drawbacks, and in particular:

- bonding requires coating and molding operations that are unsatisfactory in terms of cost and harm to the environment due to the use of adhesives and solvents;
- the inserts which are generally made of metal give rise to non-negligible extra cost;
- overmolding implies an additional swaging step to release differential stresses by radial deformation, and thus also leads to extra cost;
- force-fitting the inserts leads to stresses in the parts; and
- the system cannot be disassembled.

In other documents, for example patent EP 0 793 031, the ring has successive concave and convex undulations of essentially continuous curvature facing complementary shapes made on the hub and the rim. The undulations perform two functions, that of filtering without bonding and that of limiting torque. The concave and convex shapes allow the parts to slip relative to each other beyond a cutoff torque, and also to return to a driving configuration below the cutoff.

That type of solution leads to non-linearity in the torque exerted as angular offset increases, and thus to non-linear stiffness, which is harmful to the filtering function. To be effective filtering must be tuned to specific cutoff frequencies that differ depending on the structure of the system or the type of transmission that is to be provided. However since the system is non-linear, its resonant bandwidth is very broad and filtering is not performed correctly.

SUMMARY OF THE INVENTION

In order to remedy those drawbacks and improve the transfer function of the elastic insert, the invention proposes creating zones in which stresses act essentially in shear in the deformable material so as to implement the power transmission function alone in these zones, independently of any torque limiting effect.

More precisely, the invention provides a decoupling element of deformable material e.g. an elastic material such as rubber or elastomer, for interposing between the faces of two supports of a drive device having a central axis of rotation, the element being formed by a ring comprising a central core and at least two opposite faces. At least one of these faces and the facing face of the support present complementary abrupt projections suitable for meshing together, meshing of the ring creating zones at the roots of the projections where the central core substantially works in shear, these zones being regularly distributed over at least one of the faces of the ring. The central core extends from the protuberance-free continuous annular portion of the ring.

Under such conditions, the work of the ring is performed by reducing the radial component of the compression which would otherwise become preponderant with increasing angular offset. A linear relationship between torque and offset is then ensured, which leads to constant stiffness over a large angular range, for example a range greater than ±9°, and thus to a narrow resonant band.

In particular embodiments:

- the two opposite faces of the ring and the facing faces of the supports are fluted, or else only one face of the ring and the facing face of the support are fluted, the non-fluted face of the ring and the facing face of the support being bonded together, possibly via a linking insert;
- the faces of the ring and of the supports that mesh are cylindrical and parallel to the axis of rotation and/or radial and perpendicular to said axis, the projections being respectively radial and/or axial;
- the projections are of constant or linearly varying profile so as to facilitate unmolding and assembly by self-centering when engaging the ring on the supports;
- the projections are crenellations of right section, i.e. having side flanks that are substantially perpendicular to the face of the ring on which they are formed;
- the projections present side flanks of section that flares going away from said face, with a mean angle of up to 60° relative to the radius, being of trapezoidal shape, or hyperbolic shape, with suitable curvature and advantageously of tapering shape to facilitate unmolding or assembly by self-centering when engaging the free ring on the supports;
- when the two opposite cylindrical faces are parallel to the axis of rotation of the ring and carry opposite radial projections, the square of the ratio of the radii of the opposite cylindrical faces is inversely equal to the ratio of the angles at the center intercepting two projections on respective faces, the opposite projections being periodically distributed in a basic pattern so as to exert shear stresses over the entire ring that are constant and that are reversible on going from one direction of rotation to the other;
- the ring is split to form an opening so as to make assembly easier during insertion of the hub by expanding the ring, and during its own insertion into the rim by compressing the ring, thereby compensating for play between the parts.

The ring of the invention may be made by molding, by extrusion followed by cutting up or slicing into "washers", or by injection/compression. In some cases, the material is made flat and then rolled up and cut to shape in order to make split rings.

The present invention comes more generally within the context of a power transmission system including a torque limiter or breaker for the purpose of stopping drive in the event of jamming, and a rotary drive device including the decoupling element.

BRIEF DESCRIPTION OF THE DRAWINGS

The invention is described below in greater detail in non-limiting manner by describing embodiments with reference to the accompanying drawings, in which:

FIG. 3 is an exploded view of an embodiment of a drive device including a decoupling ring and supports of right and constant profile for a radial assembly;

FIG. 11 is a diagrammatic section view of another embodiment of the invention.

DETAILED DESCRIPTION OF THE PREFERRED EMBODIMENTS

Figure 1A:
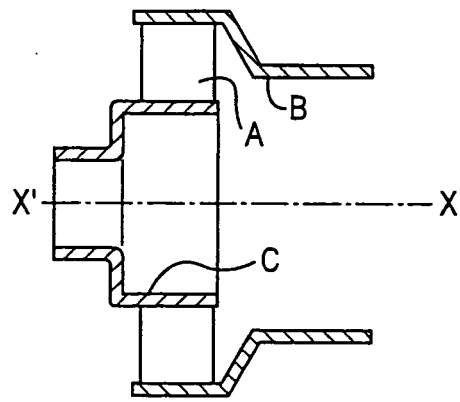
FIGS. 1a, 1b, and 1c (described above) are diagrammatic section views of a prior art ring of deformable material.
Figure 1B:
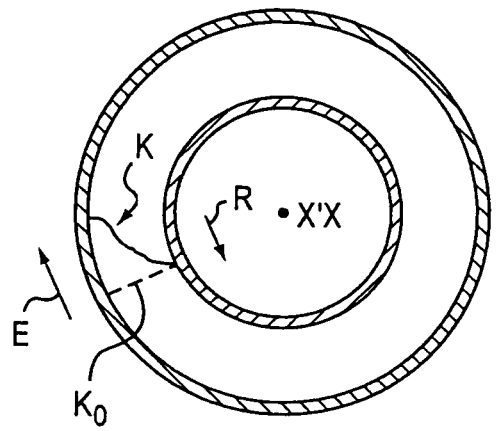
Figure 1C:
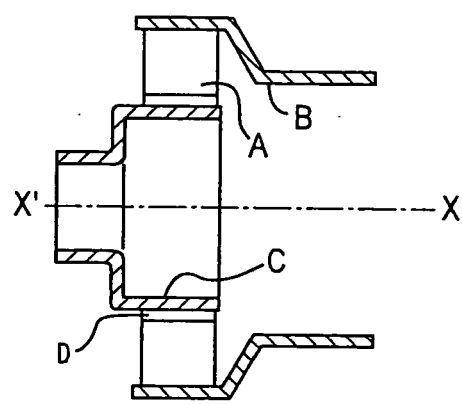
Figure 2A:
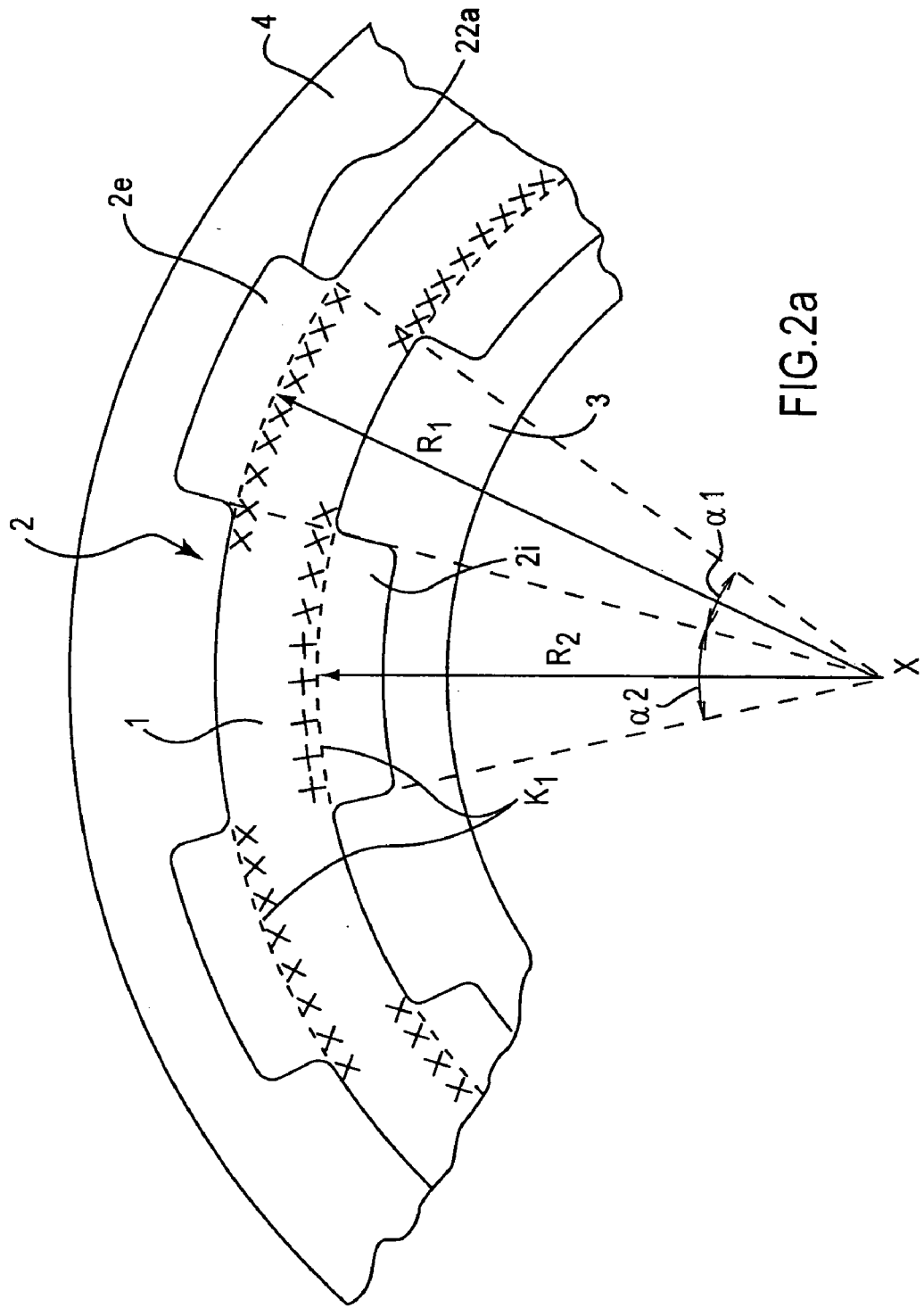
FIGS. 2a and 2b are fragmentary section views of decoupling rings of constant profile, with teeth respectively of right profile and of flared profile, the rings being mounted between two complementary supports, and the figures illustrating diagrammatically the shear behavior of rings of the invention.

As shown diagrammatically in the fragmentary section of FIG. 2a, an example of a cylindrical decoupling ring 2 of the invention comprises a continuous annular central core 1 (outlined within the ring by dashed lines in the figure) and abrupt projections 2e, 2i extending radially from the side flanks 22a and projecting at right angles in this example.

The projections respectively referenced 2e and 2i are regularly distributed in alternation respectively on the outside face 21e and on the inside face 21i of the ring in particular in order to conserve good uniformity in mass distribution. A section of ring defined by a pair of successive projections, an inside projection and an outside projection, thus forms a basic pattern which is repeated around the ring so as to form cylindrical crenellated faces.

The ring meshes between two supports comprising a central hub 3 and a rim 4 presenting faces 31 and 41 that face the complementary faces 21i and 21i of the ring. The rim and the hub are made of metal or of plastics material in the example shown, while the ring is made of rubber. The ring may be obtained by combining an elastomer material with a metal reinforcing insert, or a plurality of materials or a single elastomer material of different densities:

a density for the core which is subjected to shear and which imparts stiffness;

a density for the outer projections, advantageously including textile reinforcement to reinforce contact and combat wear; and a density for the inside projections, with textile reinforcement being optional.

Figure 2B:
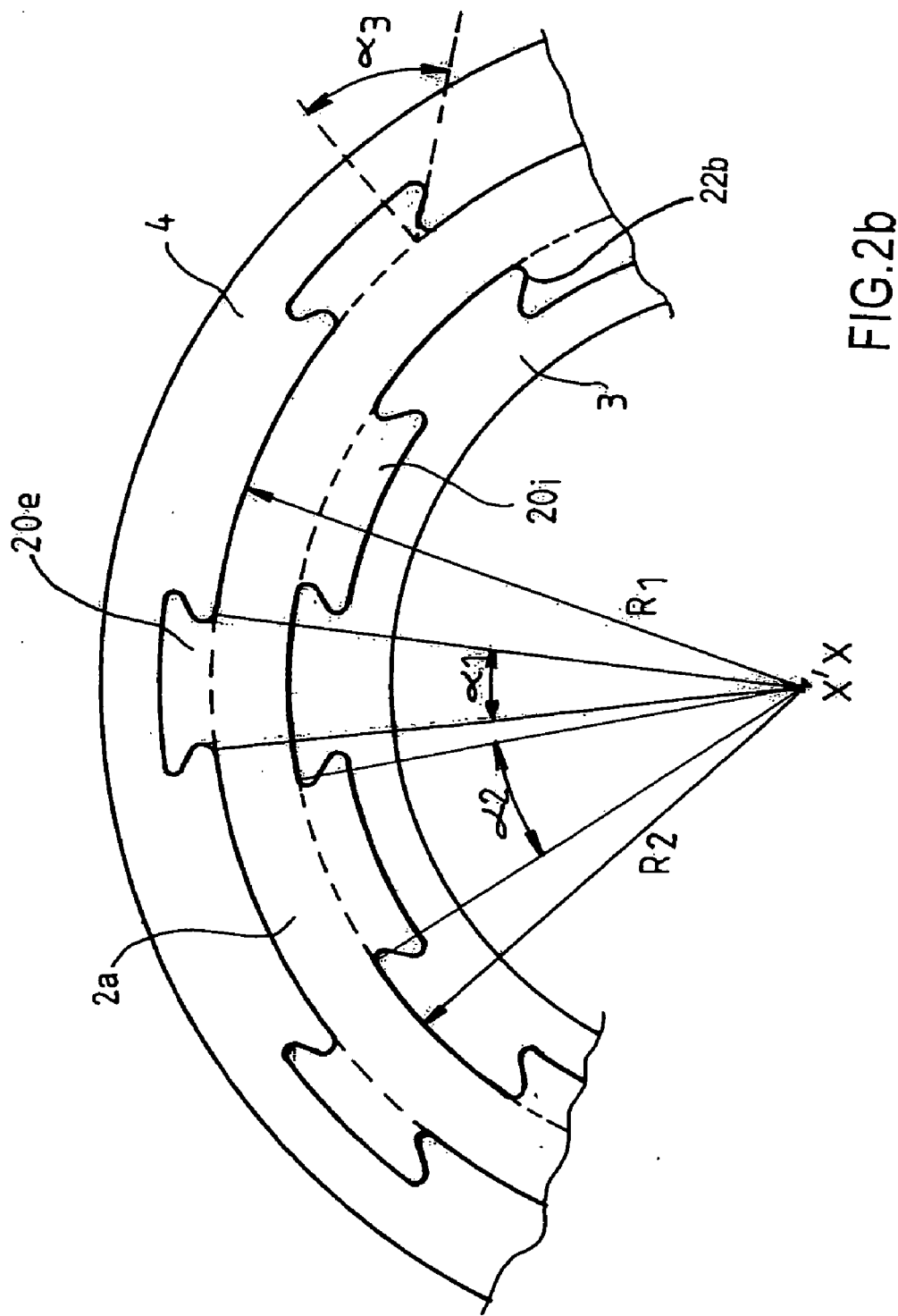

In a second example shown diagrammatically in FIG. 2b, the side flanks 22b of the projections 20e and 20i are radially flared away from the central core 1 of the ring. The projections present an "hourglass" shape in section of trapezoidal form, with a mean flare angle $\alpha_3$ that may be as much as 60°, as shown. FIG. 11 shows projections 20e' as part of ring 2" that have a hyperbolic or curved shape.

In operation, power transmission is localized at the roots of the projections 2e and 2i and takes place for the most part in the shear zones $K_1$. Because of the blocking obtained by the right or inclined side flanks, compression remains secondary.

In addition, the section of the projections is dimensioned by ratios appropriate for the sections in the working zones so as to limit bending and thus put the central core into compression, thereby enhancing work in shear, with work in compression becoming negligible.

With radial projections, the square of the ratio of the radii of the cylindrical faces 21e and 21i $(R1/R2)^2$ is advantageously substantially equal to the inverse of the ratio of the angles $(\alpha_2/\alpha_1)$ at the center intercepting two projections 2e and 2i on respective faces. This dimensioning causes the shear stresses $K_1$ exerted on the ring as a whole to be made uniform and constant, said stresses being located mainly at the roots of the projections. This dimensioning also makes the shear reversible when going from one direction of rotation to the other.

Figure 4B:
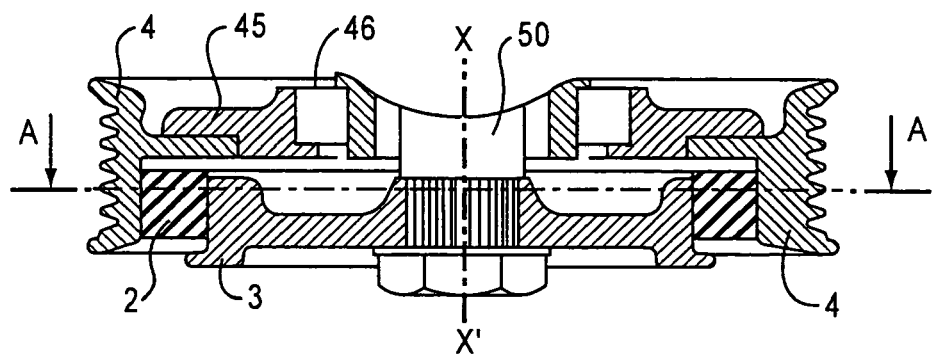
FIGS. 4a and 4b are axial and longitudinal section views on A—A and B—B showing the FIG. 3 assembly once assembled.
Figure 4A:
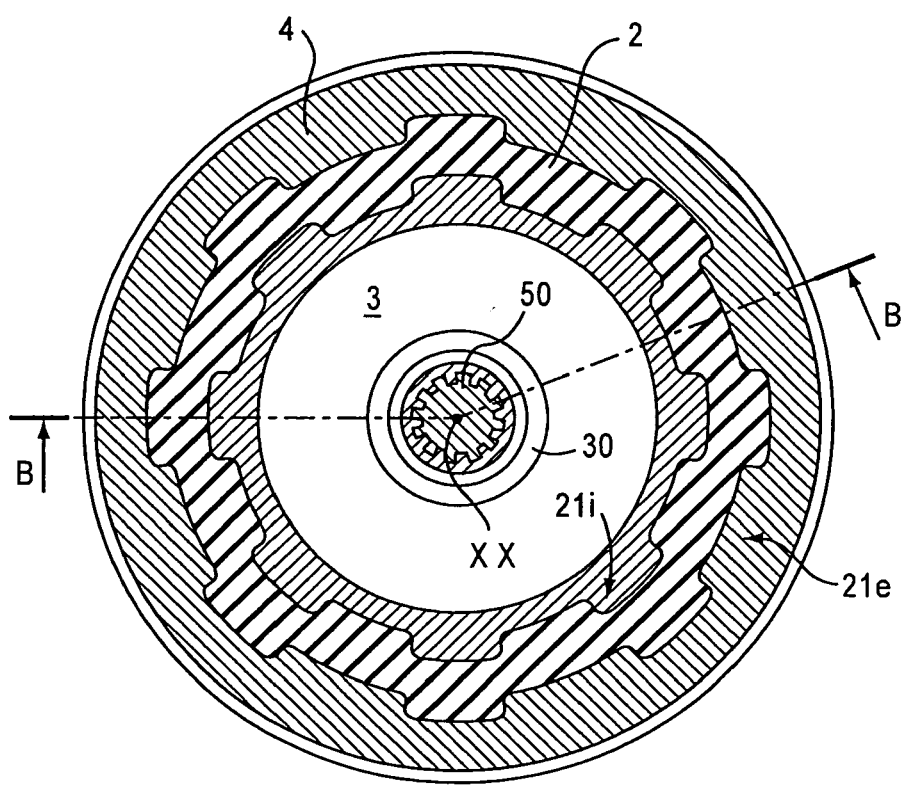

The exploded view of FIG. 3 and the section views of FIGS. 4a and 4b show an example of a drive device 10 for a motor vehicle compressor. This device comprises a cylindrical decoupling ring 2 of right and constant profile together with a central hub 3 and a rim 4 forming supports with complementary profiles that are right and constant. These elements correspond to the elements shown in FIG. 2a for making a radial assembly.

The hub 3 presents a central gear 30 for driving the shaft 50 (FIGS. 4a and 4b) of the alternator about an axis X'X. The face 31 of the hub is provided with projections 3e of right and constant profile that are complementary to recesses 22i formed between pairs of projections 2i on the face 21i of the ring 2. The rim 4 has a wall 42 presenting on its face 41 projections 41 and intervening recesses 44i for engaging respectively with the recesses 22e and the projections 2e on the face 21e of the ring.

Assembly is performed by sliding the ring between the support parts. The parts need to be finely indexed depending on the desired amount of play by using any known indexing means (optical, mechanical, etc.).

The height, i.e. the depth, of the fluting is a function of the power level of the torque to be transmitted, and also of their particular shape. By way of example, this height may lie in the range 1 mm to 5 mm.

A small amount of radial play may be retained between the parts due to manufacturing tolerances. If this is acceptable for the rim and the hub, the play can be zero with the ring then being assembled with a small amount of pressure, without that preventing disassembly.

Once assembled, the above assembly presents the appearance shown in axial and longitudinal section in FIGS. 4a and 4b. The rim 4 is centered by a strength member 45 mounted on a tube via bearings 46.

Figure 5:
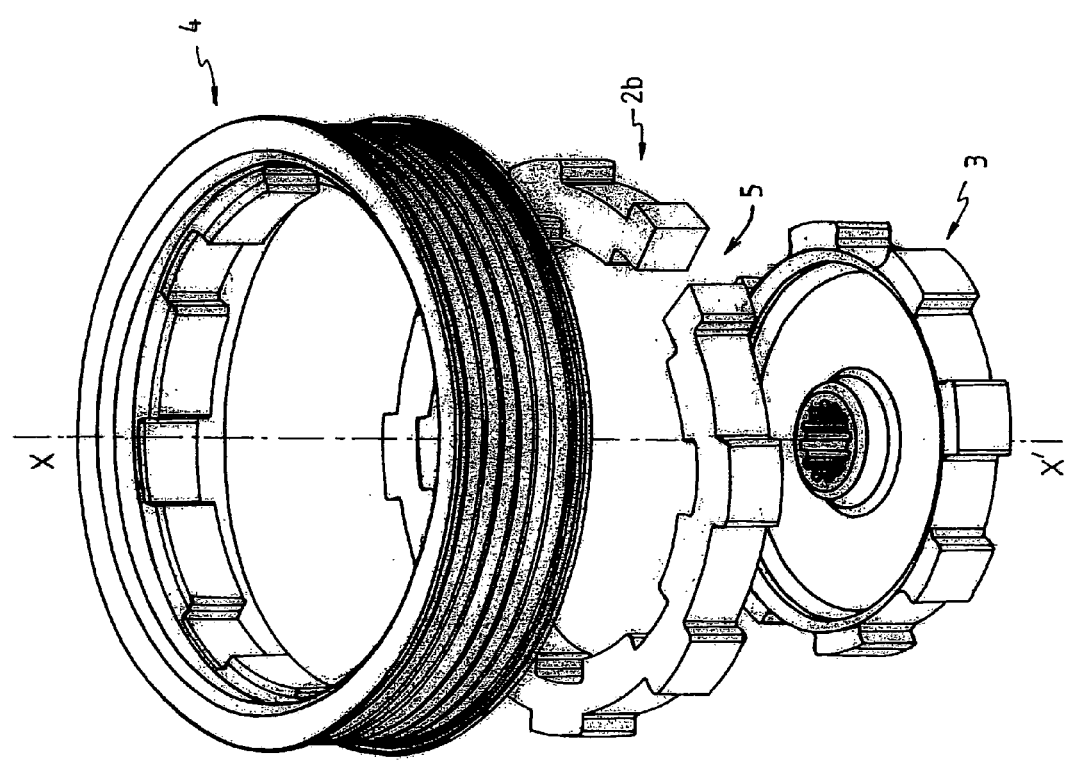
FIG. 5 is an exploded view showing a variant having a split ring.

In a variant shown in an exploded view in FIG. 5, the ring 2b is split. The opening 5 formed in this way makes assembly easier by enabling it to be opened out while the hub 3 is being inserted and by enabling it to be compressed while it is being inserted in the rim 4, thereby enabling play between said parts to be compensated. The spreading forces exerted by the hub on the ring are compensated by the compression exerted by the rim on said ring. Once assembly is completed, no play remains between the parts.

In order to make split rings, the part can be molded directly or else it can be made flat by injection/compression, and then rolled up to obtain a cylindrical part having the desired opening, after which it can be dispensed by slicing.

Figure 6:
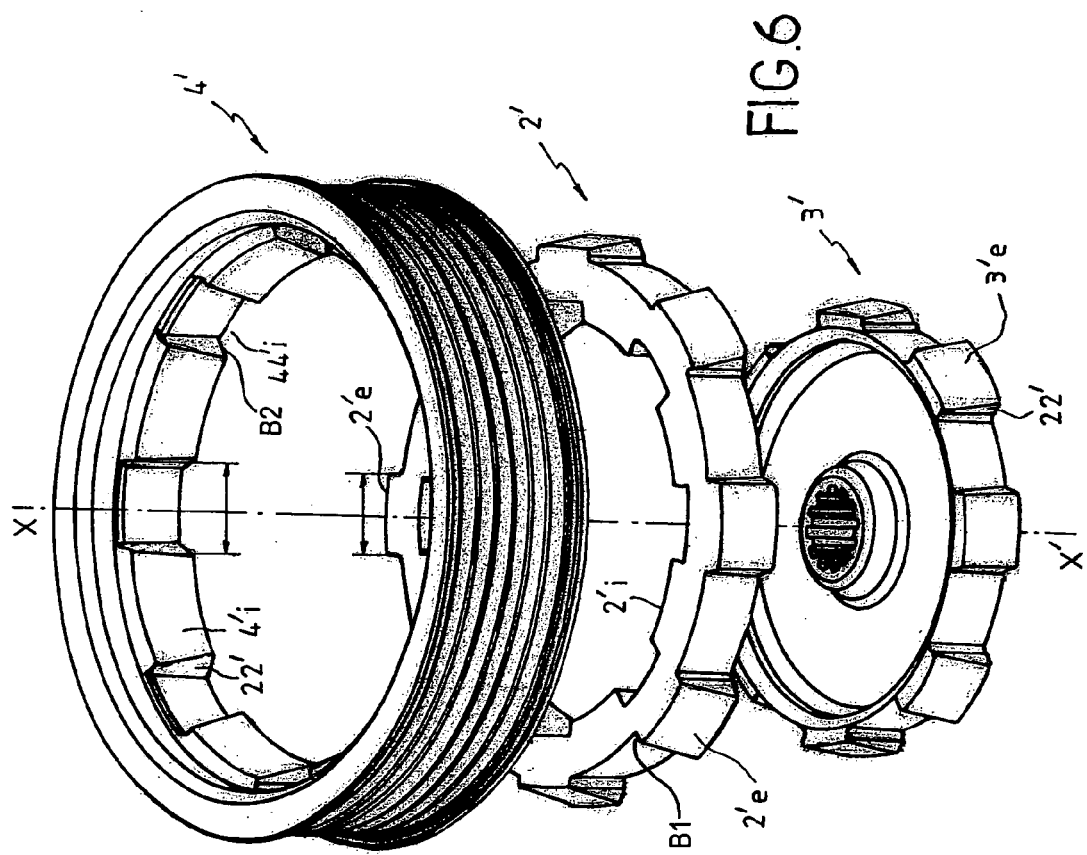
FIG. 6 is an exploded view showing a variant having a ring and supports of varying profile for self-centering purposes.

In another variant, shown in exploded view in FIG. 6, the projections 2'e and 2'i of the ring 2', and the complementary projections 3'e and 4'i respectively of the hub 3' and of the rim 4' have side flanks 22' of right radial projection, but of axial profile that varies along the axis X'X.

In this example, the axial variation in the profiles is linear so as to form projections of axial profile that is trapezoidal. Under such conditions, during assembly, the short bases B1 of the trapezoidal profiles, e.g. 2'e, are placed facing the large bases B2 of the recesses, e.g. 44'i, into which they are to be engaged: self-centering adjustment then takes place between the projections and the recesses while they are being mutually engaged. The parts can then be assembled together while taking less care with indexing. Under such circumstances, molding is preferable, nevertheless extrusion is also possible with the fluting being re-machined after slicing.

The presence of varying profile and also of appropriate tapers also makes it easier to perform unmolding during manufacture of the ring.

Figure 7:
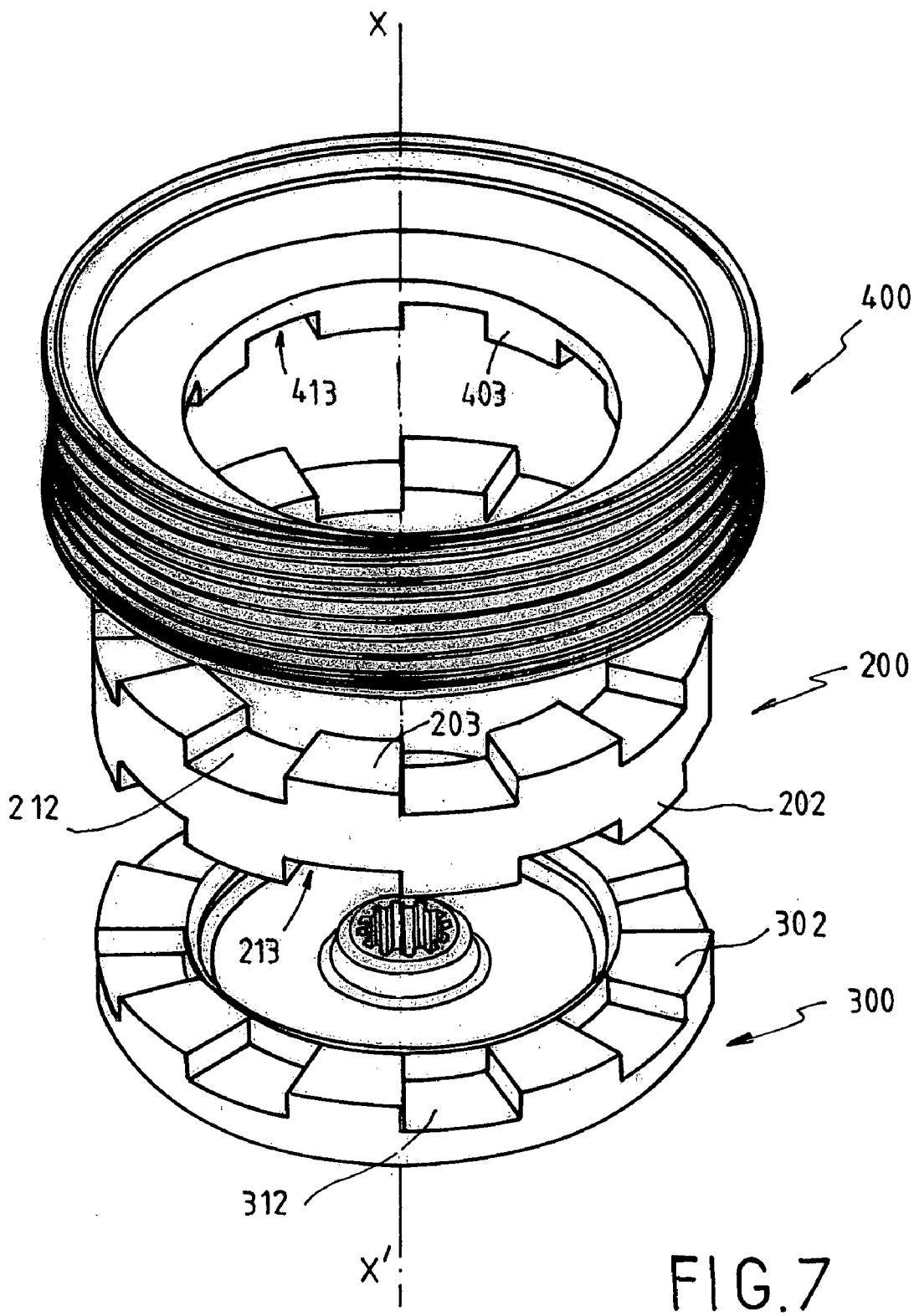
FIG. 7 is an exploded view of an embodiment of a drive device having a ring with axial projections formed on its opposite radial faces.

The example shown in FIG. 7 relates to an embodiment of the cylindrical drive device that includes a ring 200 with axial projections 202 and 203 formed on its opposite radial faces 212 and 213.

In this example, the faces 212 and 213 of the ring, the face 212 of the central hub 300, and the face 413 of the rim 400 that engage mutually are radial and perpendicular to the axis of rotation X'X. The projections 202 and 203 on the ring, the projections 302 on the hub, and the projections 403 on the rim extend axially.

Figure 8B:
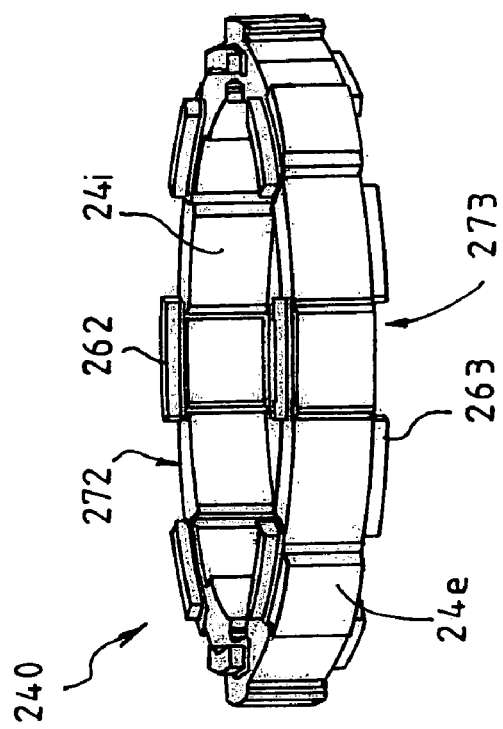
FIGS. 8a and 8b are perspective views seen from two different angles showing an example of a ring having both radial and axial projections.
Figure 8A:
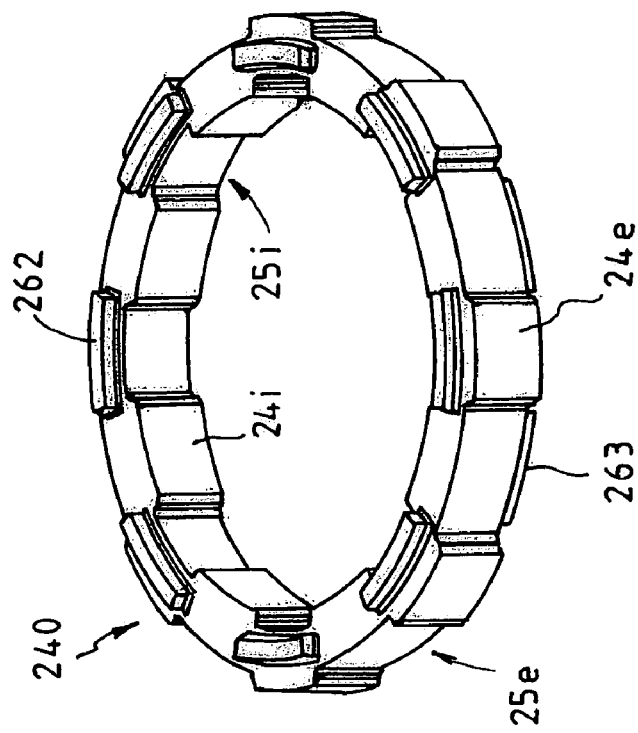

With reference to the perspective views of FIGS. 8a and 8b, there can be seen an example of a ring 240 having projections that are both radial and axial: radial projections 24i and 24e formed on the opposite axial faces, respectively the inside face 25i and the outside face 25e, are combined with axial projections 262 and 263 formed on the opposite radial faces respectively referenced 272 and 273. Overall, this combined solution uses a quantity of material to make the projections that is equivalent to the quantity used when making radial projections or axial projections alone, given that the sections of the projections in the combined technique can be, very approximately, about half size.

In the example shown, the projections are right and of constant profile, however the various sections and profiles described above can also be applied to them. As before, the projections alternate around the ring so as to conserve a central core of constant thickness and a balanced distribution of masses and of shear stresses.

Figure 9B:
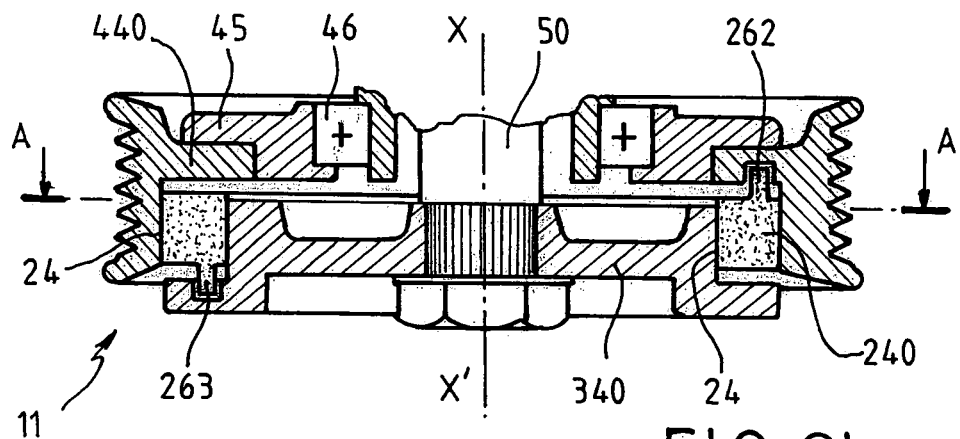
FIGS. 9a and 9b are axial and longitudinal section views on A—A and B—B showing a drive device of the invention including the ring of FIGS. 8a and 8b.
Figure 9A:
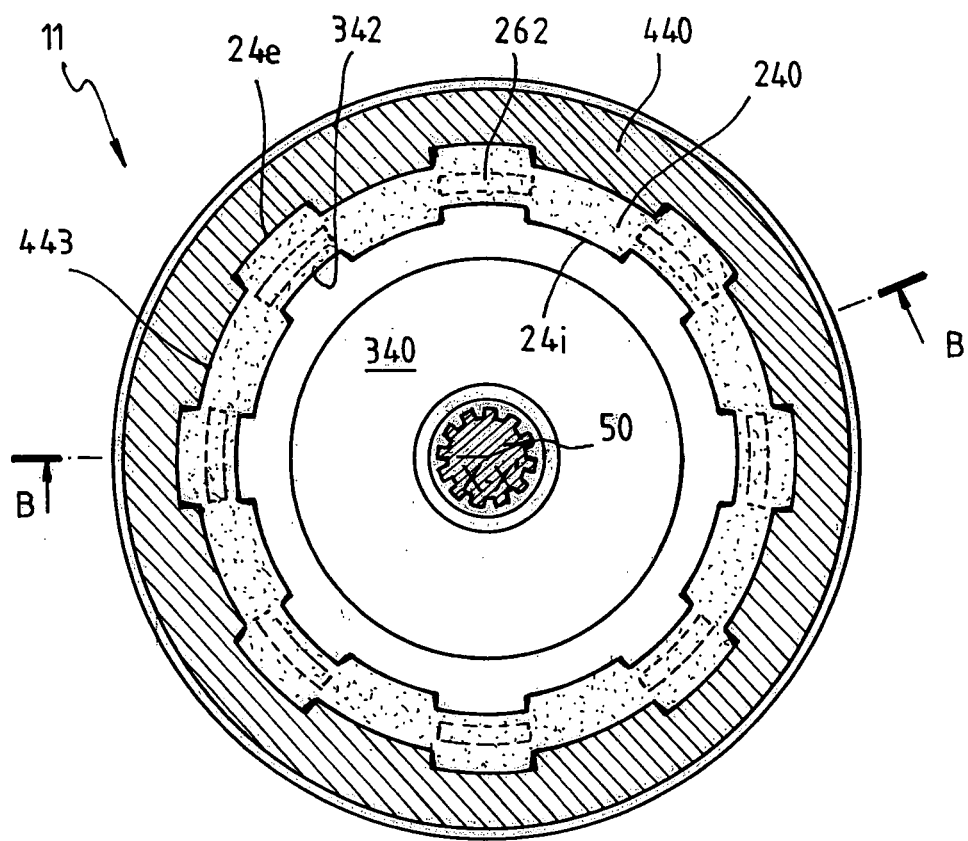

The ring 240 with combined radial and axial projections is coupled to a hub 340 and to a rim 440 presenting complementary projections 342 and 443, as shown in the axial and longitudinal sections of FIGS. 9a and 9b. The assembly forms a drive device 11 of the invention. These figures also include elements shown in FIGS. 4a and 4b that are equivalent respectively thereto, having the same reference symbols: the rim 440 is centered by a strength member 45 mounted on a tube via bearings 46.

Figure 10:
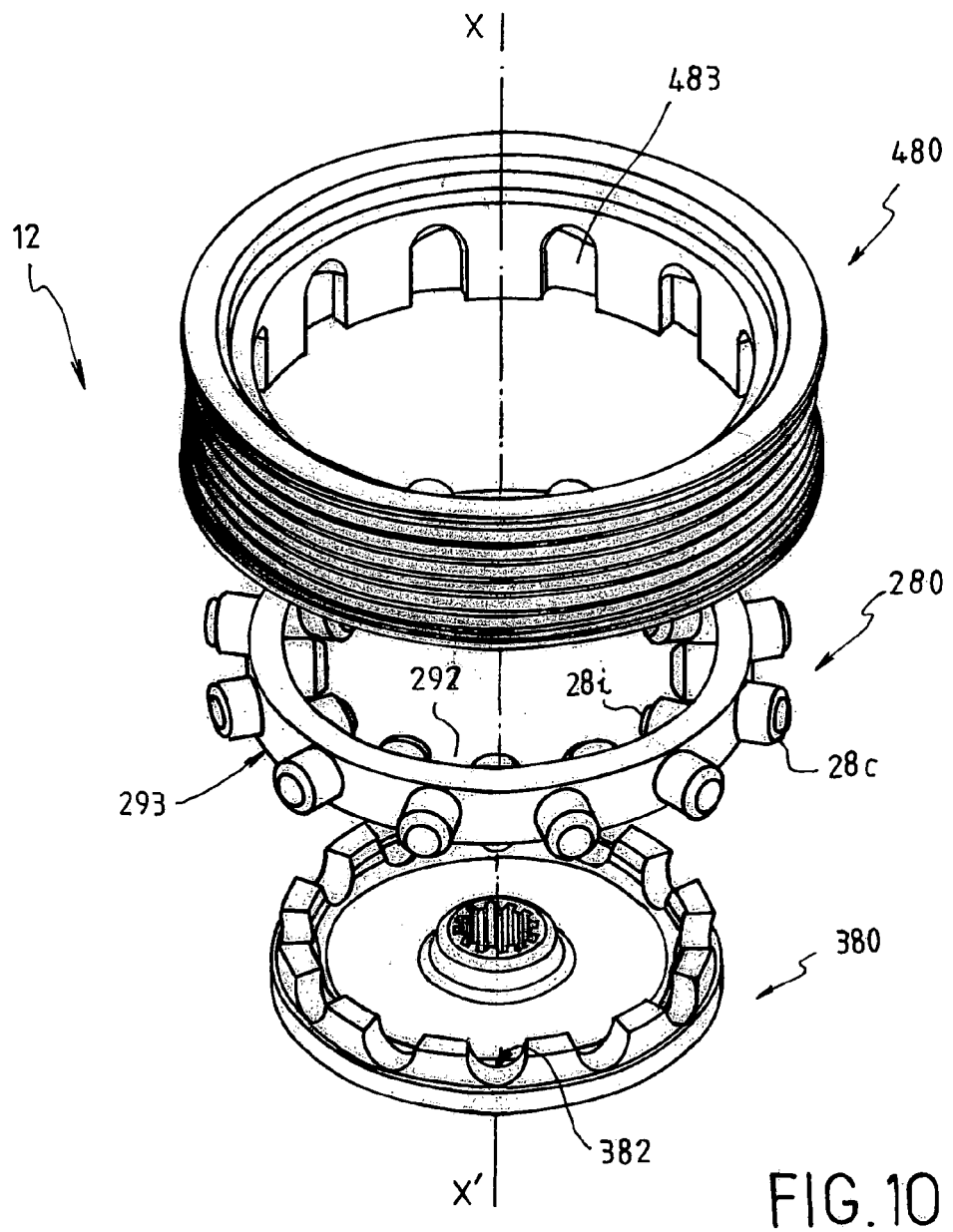
FIG. 10 is an exploded view of an embodiment of a drive device of the invention including a ring having radial projections in the form of cylindrical studs.

The exploded view of FIG. 10 shows a variant embodiment of the drive device 12 comprising a ring 280 having radial projections in the form of cylindrical studs 282 and 283 that are respectively formed in alternation on the opposing cylindrical faces 292 and 293 of the ring 280. The hub 380 and the rim 480 present respective notches 383 and 483 for receiving the studs.

The invention is not limited to the embodiments described and shown. It is possible to make the ring out of a deformable plastics material, polypropylene, polyethylene, or polyamide, or out of a composite material of the thermoplastic elastomer (TPE) type.

It is also possible to conserve an insert, and to use fluting for the outside face where the diameter makes it possible to retain more fluting. Meshing can be implemented on a single pair of facing faces between the ring and the rim or between the ring and the central hub, with the other pair of facing faces being bonded together. FIG. 11 shows an insert 2' having fluting 20e' on its outside face to mesh with recesses on the rim 4'. The inner face 22i' is bonded to the face 31' of the central hub 3'.

The invention is applicable to any drive device including a filter, damping, or absorber element. By way of example, the accessories which are driven in rotation can be any component of an engine or of a transmission of a motor vehicle.

What is claimed is:

1. A decoupling element and two support power transmission combination comprising:
   a decoupling element made of deformable material; and
   two supports;
   wherein the decoupling element is interposed between faces (31, 41; 312, 413) of the two supports (3, 4; 3', 4'; 300, 400) of a drive device having a central axis (X'X) of rotation, one of the supports adapted to be driven, the decoupling element adapted to transmit power from the one support to the other support, the other support adapted for further power transmission,
   the decoupling element further comprising a ring (2, 200) comprising a central core (1) and at least two opposite faces (21e, 21i; 212, 213), and being characterized in that these faces (21i, 21e; 212, 213) have abrupt projections meshed together with complementary abrupt projections of opposing faces (31, 41; 312, 313) of the supports (3, 4; 3', 4'; 300, 400), meshing of the ring (2, 200) creating zones ($K_1$) at the roots of the projections (2e, 2i; 2'e, 2'i; 3e, 4i; 3'e, 4'i; 20e, 20i; 202, 203; 302, 403) in the central core, where the central core (1) substantially works in shear for transmission of said power from one support to the other, these zones being regularly distributed over the faces (21e, 21i; 212, 213) of the ring (2, 200), the abrupt projections of the faces (21i, 21e; 212, 213) present whether or not the abrupt projections mesh together with the complementary abrupt projections of the opposing faces (31, 41; 312, 313) of the supports.

2. A combination according to claim 1, in which the two opposite faces of the ring (2, 200) are fluted, and are adapted to mesh together with fluted facing faces of the supports (3, 4; 3', 4'; 300, 400).

3. A combination according to claim 2, in which the square of the ratio of the radii (R1, R2) of cylindrical faces of the decoupling element is inversely equal to the ratio of the angles ($\alpha_1$, $\alpha_2$) at the center intercepting two projections (2e, 2i; 2'e, 2'i; 20e, 20i) of the respective faces, the opposite projections being periodically distributed on the basis of a pattern.

4. A combination according to claim 3, in which the projections (20e, 20i) present side flanks (22b) of section that flares from the face (21e, 21i) of the ring, with a mean angle ($\alpha_3$) of up to 60° relative to the radius (R1, R2), the projections having one of a trapezoidal, hyperbolic, or curved shape.

5. A combination according to claim 4, in which the projections (2'e, 2'I) present a profile that is constant or that varies linearly so as to facilitate unmolding and assembly by self-centering when engaging the ring (2) with the supports (3, 4).

6. A combination according to claim 1, in which a single face of the ring (2, 200) is fluted, and is adapted to mesh with a fluted single face of the support (3, 4; 3', 4'; 300, 400), the non-fluted face of the ring and the facing face of the support adapted to be bonded together.

7. combination according to claim 6, in which the non-fluted face of the ring and the facing face of the support are bonded together via a link insert.

8. A combination according to claim 1, in which the faces (21e, 21i) of the ring (2) and of the supports (3, 3'; 4, 4') which are adapted to mesh with the faces (21e, 21i) are cylindrical and parallel to the axis of rotation (X'X), the projections (2e, 2i; 2'e, 2'i; 3e, 41; 3'e, 4'i; 20e, 20i) being radial.

9. A combination according to claim 1, in which the faces (212, 213) of the ring (200) and the faces (312, 413) of the supports (300, 400) which are adapted to mesh with the faces (212, 213) therewith are radial and perpendicular to the axis (X'X), the projections (202, 203; 302, 403) being axial.

10. A combination according to claim 1, in which the faces of the ring (240) and of the supports (340, 440) which are adapted to mesh with the faces are cylindrical faces (25i, 25e) extending parallel to said axis of rotation (X,X), and radial faces (272, 273) extending perpendicularly to said axis, the projections being respectively radial (24i, 24e; 342, 443) and axial (262, 263).

11. A combination according to claim 1, in which the projections are crenellations of right section (2e, 2i) having side flanks (22a) that are substantially perpendicular to the face (21e, 21i) of the ring (2) on which they are formed.

12. A combination according to claim 11, in which the projections (2'e, 2'I) present a profile that is constant or that varies linearly so as to facilitate unmolding and assembly by self-centering when engaging the ring (2) with the supports (3, 4).

13. A combination according to claim 1, in which the ring 2b is split to form an opening (5) so as to make it easier to assemble by being splayed apart while the hub (3) is being inserted and by being compressed while it is being inserted into the rim (4).

14. A combination according to claim 1, in which the ring (2, 200) is made by one of cutting, molding, extrusion followed by slicing, injection/compression, or making the material flat and then rolling it up and then cutting it to make split rings.

15. The combination of claim 1, wherein the abrupt projections of the ring (2, 200) are separated from each other by the faces (21i, 21e; 212, 213).

* * * * *